L. WHARTON.
Improvement in Hose-Couplings.

No. 115,917. Patented June 13, 1871.

Witnesses:
Wm. H. Rowe
Henry Kaiser

Inventor:—
Levi Wharton,
by his Atty.
Wm. D. Baldwin.

UNITED STATES PATENT OFFICE.

LEVI WHARTON, OF SALEM, OHIO, ASSIGNOR TO AMOS RANK, OF SAME PLACE.

IMPROVEMENT IN HOSE-COUPLINGS.

Specification forming part of Letters Patent No. 115,917, dated June 13, 1871.

*To all whom it may concern:*

Be it known that I, LEVI WHARTON, of Salem, in the county of Columbiana and State of Ohio, have invented certain new and useful Improvements in Hose-Couplings, of which the following is a specification:

My invention relates to an improved method of connecting sections of hose by detachable couplings, to admit of the sections being readily united or separated, as exigencies may require.

The object of the first part of my invention is to attain a secure connection of the joints while permitting them readily to be united or disunited without twisting the hose; to which end the improvement consists, first, in combining a socket, a plug fitting into said socket, and spring-hooks on one section interlocking with lips on the other to hold the sections together. Second, in combining a socket, with an internal flange, a gasket or elastic packing resting on the flange, a plug bearing on the gasket, an annular groove in the plug, a packing-ring in said groove to bear against the socket, and spring-hooks on the plug locking into a lip on the socket, to secure a tight joint and yet allow the coupling to turn to prevent twisting of the hose.

Figure 1:
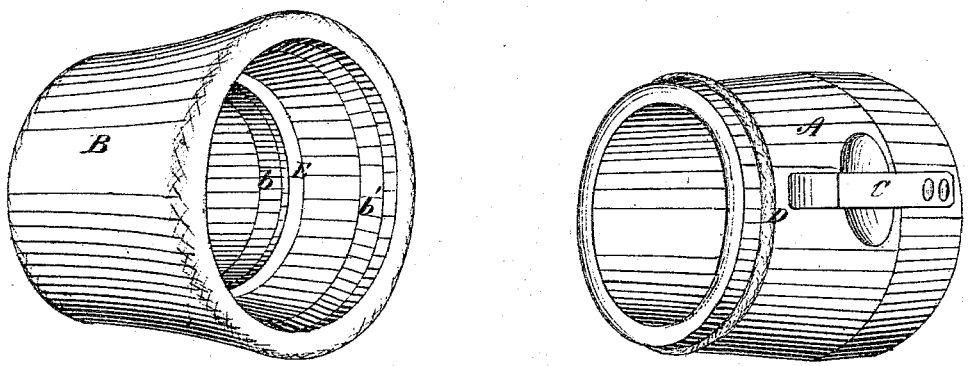
Figure 2:
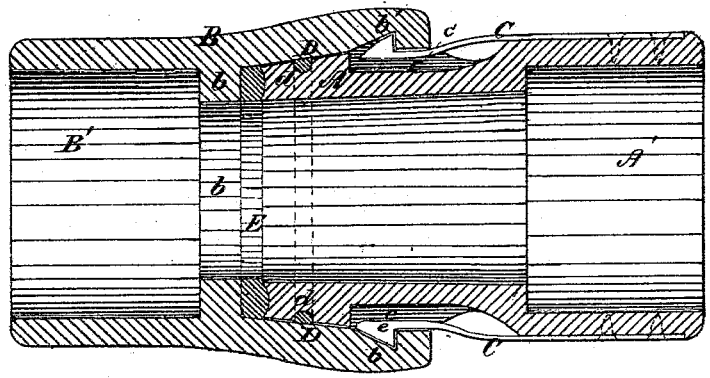

In the accompanying drawing, Figure 1 is a view in perspective of the plug and socket detached; Fig. 2, a longitudinal section through the coupling.

The bore B' of the socket B, at that end which is nearest the hose, is of a size corresponding with the bore A' of the plug A. An annular flange, $b$, arranged in the interior of the socket, serves as a support for a packing-ring or gasket, E, of rubber or other suitable material. The front end or mouth D of the socket flares outward slightly, and its outer end is provided with an annular lip, $b'$. The plug A tapers at its inner end to conform to the flare of the socket; its end bears against the gasket E. An annular groove in the plug is fitted with a packing-ring, $d$. Spring-hooks, C, on the plug catch on the lips $b$, as the plug enters the socket, and locks the sections firmly together; they are released by pressing with the hand on the springs and drawing the sections apart.

Thus, by my invention the sections can readily be united or severed without the use of a spanner or without twisting the hose; all that is necessary to unite the sections being to press the plug into the socket. The gaskets make the joints tight.

I claim as my invention—

1. The combination of the flaring socket, its internal lip, the tapering plug, and the spring-hooks on the plug, interlocking with the internal flange on the lip, all these members being constructed to operate in combination, substantially as hereinbefore set forth.

2. The combination of the socket, its internal flange, the gasket E resting on the flange, the plug inserted in the socket and bearing on the gasket, the packing-ring surrounding the plug, the spring-hooks on the plug, and the lip in the socket, into which they interlock, all these members being constructed to operate in combination, substantially as hereinbefore set forth.

In testimony whereof I have hereunto subscribed my name.

LEVI WHARTON.

Witnesses:
WILLIS CADWALLADER,
AMOS RANK.